(12) United States Patent
Moon

(10) Patent No.: US 9,987,595 B2
(45) Date of Patent: Jun. 5, 2018

(54) HEADER FOR FILTRATION MEMBRANE AND FILTRATION MEMBRANE MODULE COMPRISING THE SAME

(71) Applicant: KOLON INDUSTRIES, INC., Gwacheon-si, Gyeonggi-do (KR)

(72) Inventor: Heewan Moon, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days. days.

(21) Appl. No.: 13/978,437

(22) PCT Filed: Dec. 17, 2012

(86) PCT No.: PCT/KR2012/010994
§ 371 (c)(1),
(2) Date: Jul. 5, 2013

(87) PCT Pub. No.: WO2013/100461
PCT Pub. Date: Jul. 4, 2013

(65) Prior Publication Data
US 2014/0048472 A1    Feb. 20, 2014

(30) Foreign Application Priority Data

Dec. 27, 2011 (KR) .......... 10-2011-0143518

(51) Int. Cl.
*B01D 63/00* (2006.01)
*B01D 63/02* (2006.01)
(Continued)

(52) U.S. Cl.
CPC ............ *B01D 63/02* (2013.01); *B01D 63/00* (2013.01); *B01D 63/022* (2013.01);
(Continued)

(58) Field of Classification Search
CPC ...... B01D 69/02; B01D 69/022; B01D 69/08; B01D 63/02; B01D 63/021; B01D 69/04;
(Continued)

(56) References Cited

U.S. PATENT DOCUMENTS 6,331,248 B1    12/2001 Taniguchi et al.
7,005,100 B2 *   2/2006 Lowell .......................... 264/263
(Continued)

FOREIGN PATENT DOCUMENTS

CN       101842151 A    9/2010
JP       574627 U      10/1993
(Continued)

OTHER PUBLICATIONS

ASTM Standard D2240, 2000, "Standard Test Method for Rubber Property—Durometer Hardness," ASTM International, West Conshohocken, PA, 2000, DOI: 10.1520/D2240-00, www.astm.org.*

(Continued)

*Primary Examiner* — Katherine Zalasky
*Assistant Examiner* — Benjamin L Lebron
(74) *Attorney, Agent, or Firm* — Sughrue Mion, PLLC

(57) ABSTRACT

Disclosed is a header which can prevent a fixing layer for fixing the filtration membrane in the header from being detached from the header and a filtration membrane module comprising the same. A filtration membrane module of the present invention comprises a filtration membrane, a header comprising a case having an opening at an upper part thereof and a partition dividing an inner space of the case into a first space for insertion of the filtration membrane and a second space for fixing the filtration membrane, and a fixing layer. The filtration membrane is potted in the fixing layer which, together with the case, forms a filtrate collecting space in the first space. The partition has a through-hole. The fixing layer (Continued)

exists in at least a portion of the first space, in the second space, and in the through-hole of the partition as well.

7 Claims, 3 Drawing Sheets

(51) Int. Cl.
| | |
|---|---|
| *B01D 65/00* | (2006.01) |
| *B01D 69/08* | (2006.01) |
| *B01D 61/02* | (2006.01) |
| *B01D 61/14* | (2006.01) |
| *C02F 1/44* | (2006.01) |
| *B01D 63/08* | (2006.01) |

(52) U.S. Cl.
CPC ......... *B01D 63/023* (2013.01); *B01D 65/003* (2013.01); *B01D 69/08* (2013.01); *B01D 61/02* (2013.01); *B01D 61/14* (2013.01); *B01D 63/021* (2013.01); *B01D 63/08* (2013.01); *B01D 2313/04* (2013.01); *B01D 2313/21* (2013.01); *B01D 2315/06* (2013.01); *C02F 1/44* (2013.01)

(58) Field of Classification Search
CPC .......... B01D 2201/29; B01D 2201/293; B01D 2201/298; B01D 63/00; B01D 63/022; B01D 63/023; B01D 65/003; B01D 61/02; B01D 61/14; B01D 2313/04; B01D 2313/21; B01D 2315/06; B29C 65/00; B29C 65/70; C02F 1/44
See application file for complete search history.

(56) References Cited

U.S. PATENT DOCUMENTS

| | | | |
|---|---|---|---|
| 7,727,393 B2* | 6/2010 | Lee et al. ................. | 210/321.69 |
| 2004/0178136 A1* | 9/2004 | Taniguchi .............. | B01D 63/02 |
| | | | 210/321.79 |
| 2007/0144716 A1* | 6/2007 | Doh et al. ..................... | 165/158 |
| 2007/0163942 A1 | 7/2007 | Tanaka et al. | |
| 2009/0218274 A1* | 9/2009 | Sakashita ............... | B01D 63/02 |
| | | | 210/321.6 |
| 2010/0038301 A1* | 2/2010 | Lee et al. ................... | 210/321.6 |

FOREIGN PATENT DOCUMENTS

| | | | |
|---|---|---|---|
| JP | 200211331 A | | 1/2002 |
| JP | 2003-117354 A | | 4/2003 |
| JP | 2003-181248 A | | 7/2003 |
| JP | 2008-142583 | * | 6/2008 |
| JP | 2008142583 A | | 6/2008 |
| JP | 5721864 B2 | | 5/2015 |
| KR | 10-0136835 B1 | | 1/1998 |
| KR | 10-2001-0034351 A | | 4/2001 |
| KR | 10-0820583 B1 | | 4/2008 |
| KR | 10-2010-0131366 A | | 12/2010 |
| WO | 9710893 A1 | | 3/1997 |
| WO | 2009/057903 A2 | | 5/2009 |

OTHER PUBLICATIONS

Material Safety Data Sheet—Glycerin MSDS, Science Lab.com, Created Oct. 10, 2005, Updated May 21, 2013.*
Machine Translation of KR100136835, dated Jan. 30, 1998.*
State Intellectual Property Office of the P.R.C., communication dated Apr. 22, 2015 in counterpart application No. 201280047052.3.
Intellectual Property Corporation of Malaysia; Communication dated Aug. 15, 2017 in counterpart application No. PI 2013002660.

* cited by examiner

[Fig. 1]
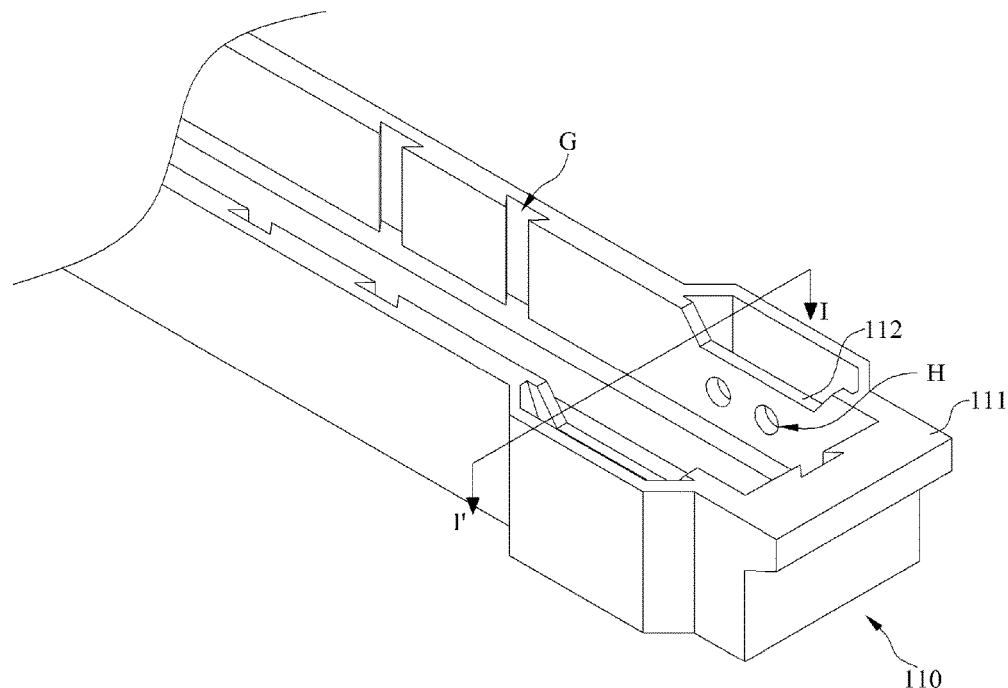
[Fig. 2]
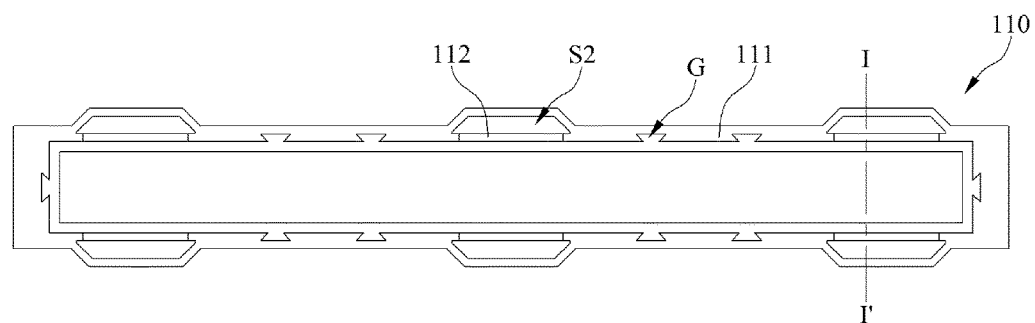
[Fig. 3]
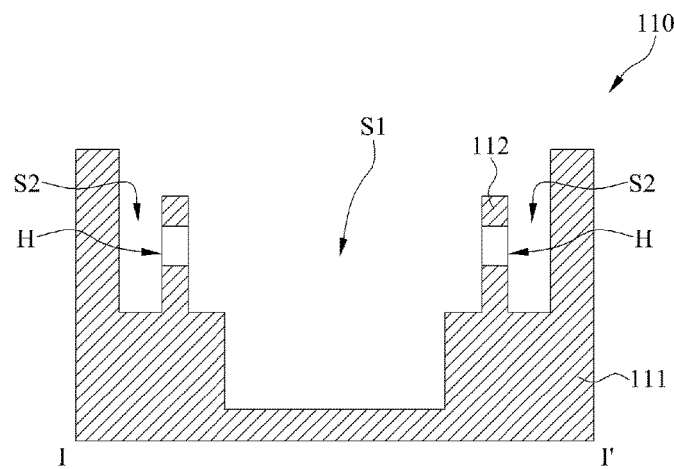

[Fig. 4]
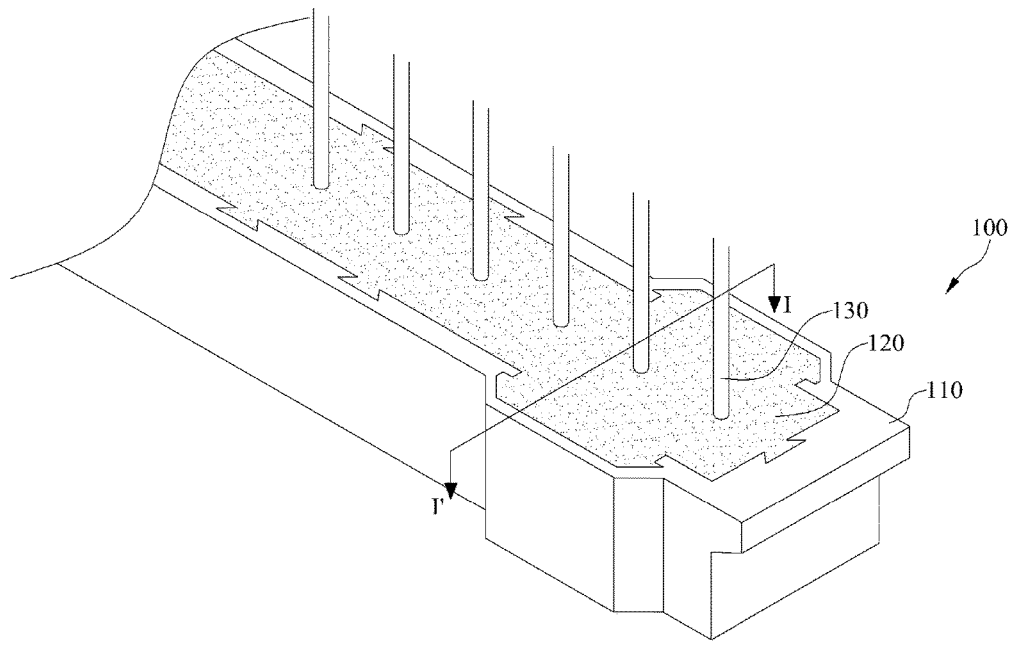
[Fig. 5]
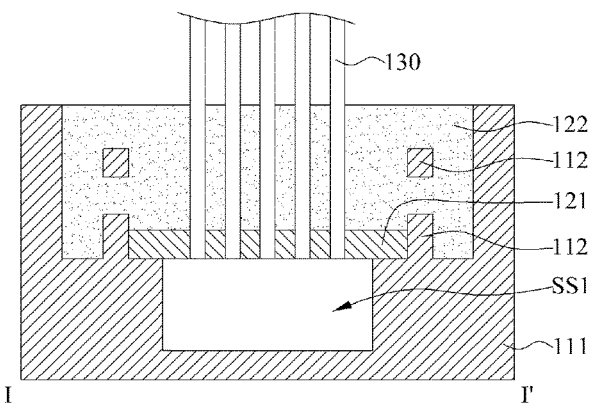
[Fig. 6]
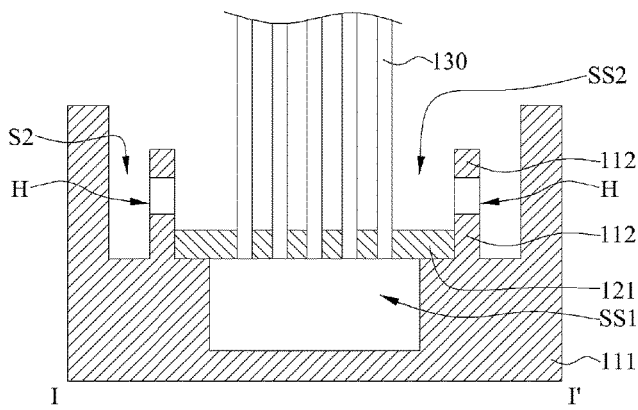

[Fig. 7]
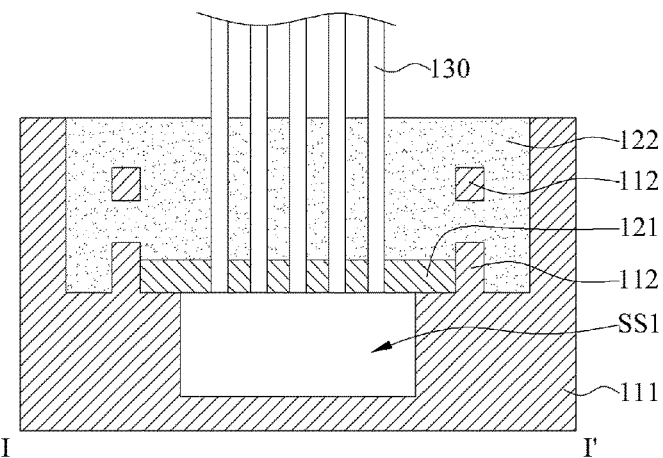
[Fig. 8]
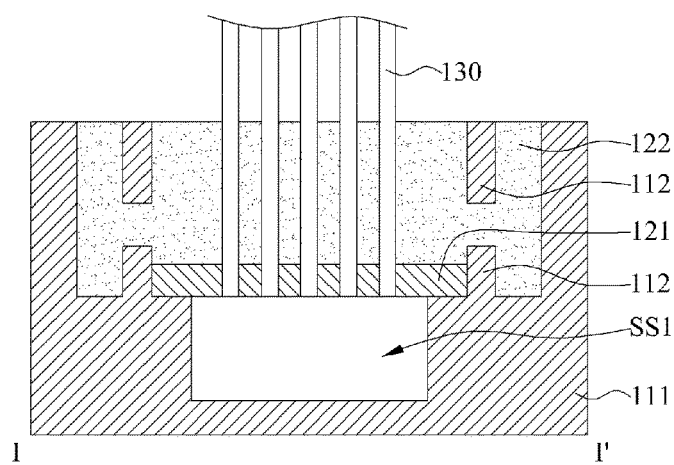
[Fig. 9]
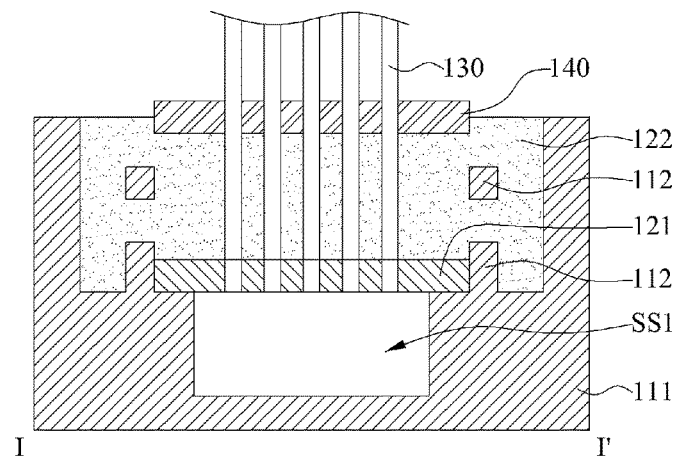

HEADER FOR FILTRATION MEMBRANE AND FILTRATION MEMBRANE MODULE COMPRISING THE SAME

TECHNICAL FIELD

The present invention relates to a header for a filtration membrane and a filtration membrane module comprising the same, and more particularly, to a header which can prevent a fixing layer for fixing the filtration membrane in the header from being detached from the header and a filtration membrane module comprising the same.

BACKGROUND ART

Separation methods for water treatment include a heating or phase-change method, a filtration membrane method, and the like. According to the filtration membrane method, it is possible to obtain the water of quality as desired by controlling the size of the fine pores of the filtration membrane, which advantageously improves the reliability of process. Furthermore, since the filtration membrane method does not require a heating process, it can be advantageously used for water treatment using microorganisms that could be adversely affected by heat.

Among the filtration membrane methods is a method using a hollow fiber membrane module in which a bundle of hollow fiber membranes are disposed. Conventionally, the hollow fiber membrane module is widely used in the field of precision filtration such as preparation of sterile water, drinking water, ultrapure water or the like. Recently, however, the application field of the hollow fiber membrane module is extending to sewage/waste water disposal, separation of solids in sewage disposal tank, removal of suspended solids (SS) in industrial waste water, filtration of stream water, filtration of industrial water, filtration of pool water and the like.

Generally, a filtration apparatus using hollow fiber membranes has a bundle of hollow fiber membranes of a certain length and is classified into a submerged-type and a pressurized-type depending on the operation manner thereof.

In case of a pressurized-type filtration apparatus, as a fluid to be processed is pressurized, only a pure fluid is allowed to permeate the hollow fiber membrane and come into the hollow thereof while the contaminants such as impurities or sludge remains outside the membrane. Although requiring additional facilities for a fluid circulation, the pressurized-type filtration apparatus is advantageous in that it can produce more filtrate for an unit time than a submerged-type filtration apparatus.

On the other hand, in case of a submerged-type filtration apparatus, a hollow fiber membrane module is submerged in a bath containing a fluid to be processed. As a negative pressure is applied inside the hollow fiber membrane, only pure fluid is allowed to permeate the membrane and come into the hollow thereof while the contaminants such as impurities or sludge remains outside the membrane. Although producing less filtrate for an unit time than a pressurized-type filtration apparatus, the submerged-type filtration apparatus is advantageous in that it can decrease the costs for setting up the facilities and for operating thereof since it does not require any facility for the fluid circulation.

Both pressurized-type and submerged type filtration apparatuses may be classified into a double-ends collecting type which collects the filtrate permeating the hollow fiber membrane and coming into the hollow thereof through the both ends thereof and a single-end collecting type which collects the filtrate only through one end of the hollow fiber membrane.

Any of the pressurized-type and submerged type filtration apparatuses requires a filtrate collecting space for collecting the filtrate which has permeated the hollow fiber membrane and come into the hollow thereof, and a means for spatially separating the filtrate collecting space from the fluid to be treated. The means for spatially separating the filtrate collecting space from the fluid to be treated is often referred as a fixing layer since it also performs a function for fixing a bundle of hollow fiber membranes in a header. The bundle of hollow fiber membranes are potted in the fixing layer.

As the filtration process is performed, the impurities existing in the fluid to be treated attaches to the surface of the filtration membrane thereby causing the fouling problem, i.e., the contamination of the filtration membrane. The fouling of the membrane reduces the filtration efficiency of the filtration membrane. Thus, it is necessary to clean the filtration membrane during the filtration process. Generally, an aeration cleaning is carried out to clean the filtration membrane during the filtration process. According to the aeration cleaning method, an aeration tube disposed below the filtration membrane module strongly eject the bubbles which impact with the filtration membrane thereby removing the impurities attached to the surface thereof.

The aeration cleaning, however, causes the vibration of the filtration membrane, weakens the adhesion between the header and the fixing layer in which the filtration membrane is potted, and finally causes the separation of the fixing layer from the header.

DISCLOSURE

Technical Problem

Therefore, the present invention is directed to a header for a filtration membrane and a filtration membrane module comprising the same capable of preventing these limitations and drawbacks of the related art.

An aspect of the present invention is to provide a header for a filtration membrane which can prevent a fixing layer for fixing the filtration membrane in the header from being detached from the header.

Another aspect of the present invention is to provide a filtration membrane module which can prevent a fixing layer for fixing the filtration membrane in a header from being detached from the header.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof.

Technical Solution

In accordance with the one aspect of the present invention, there is provided a header for a filtration membrane, the header comprising a case having an opening at an upper part thereof and a partition dividing an inner space of the case into a first space for insertion of the filtration membrane and a second space for fixing the filtration membrane, wherein the partition has a through-hole, and wherein the first and second spaces are in fluid communication with each other through the through-hole.

In accordance with another aspect of the present invention, there is provided a filtration membrane module comprising a filtration membrane, a header comprising a case having an opening at an upper part thereof and a partition dividing an inner space of the case into a first space for insertion of the filtration membrane and a second space for fixing the filtration membrane, and a fixing layer, the case and the fixing layer forming a filtrate collecting space in the first space, wherein the filtration membrane is potted in the fixing layer and has an open end to be in fluid communication with the filtrate collecting space, wherein the partition has a through-hole, and wherein the fixing layer exists in at least a portion of the first space, in the second space, and in the through-hole of the partition as well.

The general description provided above and the detailed description provided below are provided only for illustration of the present invention and be construed as providing a more detailed description of inventions defined in claims.

Advantageous Effect

According to the present invention, the fixing layer for fixing the filtration membrane in the header can make movement neither in vertical direction nor in horizontal direction relative to the header, and thus the fixing layer is prevented from being detached from the header.

As a result, the present invention can improve the durability of the filtration membrane module, remove any possibility of fatal mistake that might be caused due to the damage of the module during the filtration process, and thus raise the reliability of the filtration membrane module.

DESCRIPTION OF DRAWINGS

The above and other objects, features and other advantages of the present invention will be more clearly understood from the following detailed description taken in conjunction with the accompanying drawings, in which:

FIG. 1 is a perspective view schematically showing a header for a filtration membrane according to an embodiment of the present invention;

FIG. 2 is a top view of the header for a filtration membrane according to an embodiment of the present invention;

FIG. 3 is a cross-section view of the header for a filtration membrane according to an embodiment of the present invention along the line I-I' in FIG. 1 and FIG. 2;

FIG. 4 is a perspective view schematically showing a filtration membrane module according to an embodiment of the present invention;

FIG. 5 is a cross-section view of the filtration membrane module according to an embodiment of the present invention along the line I-I' in FIG. 4;

FIG. 6 and FIG. 7 are cross-section views for illustrating a method for manufacturing a filtration membrane module according to an embodiment of the present invention;

FIG. 8 is a cross-section view of the filtration membrane module according to another embodiment of the present invention; and FIG. 9 is a cross-section view of the filtration membrane module according to further another embodiment of the present invention.

MODE FOR INVENTION

Those skilled in the art will appreciate that various modifications, additions and substitutions are possible, without departing from the scope and spirit of the invention. Accordingly, the present invention includes all alternations and modifications that fall within the scope of inventions described in claims and equivalents thereto.

Hereinafter, a header for a filtration membrane and a filtration membrane module comprising the same according to the embodiments of the present invention will be described in detail with reference to the annexed drawings.

Although the drawings of the present invention illustrate the hollow fiber membrane as a filtration membrane, the present invention is not limited to the hollow fiber membrane, and any other types of filtration membrane such as a plain membrane, i.e., film-shaped membrane, can be applied to the header and filtration membrane module of the present invention.

FIG. 1 to FIG. 3 are respectively a perspective view, a top view, and a cross-section view along the line I-I' schematically showing a header for a filtration membrane according to an embodiment of the present invention.

As illustrated in FIG. 1 to FIG. 3, the header 110 of the present invention for a filtration membrane comprises a case 111 having an opening at an upper part thereof and at least one partition 112 dividing an inner space of the case 111 into a first space S1 for insertion of the filtration membrane (not shown) and a second space S2 for fixing the filtration membrane. As shown in FIG. 1, the case 111 and the at least one partition 112 partition may be integrally formed into a unitary body.

The partition 112 has at least one through-hole H, and the first and second spaces S1 and S2 are in fluid communication with each other through the through-hole H of the partition 112.

According to one embodiment of the present invention, the case 111 comprises a bottom and side walls, and the second space S2 is disposed between at least a portion of the side wall of the case 111 and the partition 112. Optionally, the partition 112 may have a height smaller than that of a portion of the side wall which, together with the partition 112, forms the second space S2. That is, the height of the partition 112 may be smaller than that of the side wall of the case 111.

According to one embodiment of the present invention, the case 111 has a plurality of grooves G at the inner side surface thereof. Optionally, each of the plurality of grooves G can be formed at the inner side surface of the case 111 in such a manner that each groove G has a tapered shape getting larger toward an outer side surface of the case 111.

A filtration membrane module 100 of the present invention comprising the header 110 for a filtration membrane as explained above will be described in detail below.

FIG. 4 and FIG. 5 are respectively a perspective view and a cross-section view along the line I-I' of a filtration membrane module 100 according to an embodiment of the present invention.

As illustrated in FIG. 4 and FIG. 5, the filtration membrane module 100 comprises a filtration membrane 130 and a header 110 for the filtration membrane 130. As explained above, the header 110 comprises a case 111 having an opening at an upper part thereof and a partition 112 dividing an inner space of the case 111 into a first space S1 for insertion of the filtration membrane 130 and a second space S2 for fixing the filtration membrane 130. The second space S2 is disposed between at least a portion of a side wall of the case 111 and the partition 112. As shown in FIG. 5, the case 111 and the partition 112 partition may be integrally formed into a unitary body.

The filtration membrane module 100 of the present invention further comprises a fixing layer 120, the case 111 and the fixing layer 120 forming a filtrate collecting space SS1 in the first space S1. The filtration membrane 130 is potted in the fixing layer 120 and has an open end to be in fluid communication with the filtrate collecting space SS1.

The partition 112 has a through-hole H, and the fixing layer 120 exists in at least a portion of the first space S1 (i.e., the rest space of the first space S1 other than the filtrate collecting space SS1), in the second space S2, and in the through-hole H of the partition 112 as well.

The interaction between the partition 112 and the part of the fixing layer 120 existing in the portion of the first space S1 and the second space S2 can prevent the fixing layer 120 from moving in horizontal direction (i.e., a direction parallel with the upper surface of the fixing layer 120) relative to the header 110.

Further, the interaction between the partition 112 and the part of the fixing layer 120 existing in the through-hole H of the partition 112 can prevent the fixing layer 120 from moving in vertical direction (i.e., a direction perpendicular with the upper surface of the fixing layer 120) relative to the header 110.

Thus, according to the present invention, the partition 112, one of the elements constituting the header 110, can prevent the relative movement of the fixing layer 120 and the header 110 in both horizontal and vertical directions. Consequently, the fixing layer 120 can be prevented from being detached from the header 110.

According to one embodiment of the present invention, as illustrated in FIG. 4, the case 111 has a plurality of grooves G at the inner side surface thereof, each of the plurality of grooves G has a tapered shape getting larger toward an outer side surface of the case 111, and a part of the fixing layer 120 is inserted in the grooves G.

Thus, owing to the interaction between the grooves G and the part of the fixing layer 120 inserted in the grooves G, the relative movement of the fixing layer 120 and the header 110 in horizontal direction can be prevented more strongly.

The interaction between the grooves G and the part of the fixing layer 120 inserted in the grooves G, however, can be of little help to prevent the relative movement of the fixing layer 120 and the header 110 in vertical direction. To be of some help to prevent the relative movement of the fixing layer 120 and the header 110 in vertical direction, the grooves G can be formed at the inner side surface of the case 111 in such a manner that each groove G has a tapered shape getting larger toward the bottom of the case 111.

According to one embodiment of the present invention, as illustrated in FIG. 5, the fixing layer 120 comprises a first sub-fixing layer 121 forming the filtrate collecting space SS1 in the first space S1 together with the case 111, and a second sub-fixing layer 122 on the first sub-fixing layer 121. In this case, the second sub-fixing layer 122 exists in at least a portion of the first space S1, in the second space S2, and in the through-hole H of the partition 112 as well.

It is desirable for the fixing layer 120 to be formed of a material of high hardness in that the filtration membranes 130, e.g., hollow fiber membranes, need to be maintained at a certain interval and the fixing layer 120 must not allow the fluid to permeate therethrough. According to one embodiment of the present invention, the first and second sub-fixing layers 121 and 122 are formed of same material.

According to one embodiment of the present invention, the height of the partition 112 is smaller than that of the side wall of the case 111, and a portion of the second sub-fixing layer 122 exists directly above the partition 112.

Referring to FIG. 6 and FIG. 7, a method according to one embodiment of the present invention for manufacturing a filtration membrane will be explained below in detail. For the sake of convenience, a hollow fiber membrane will be illustrated as an example of the filtration membrane.

First, the hollow fiber membranes 130 potted in the first sub-fixing layer 121 are prepared as below.

The open ends (formed by cutting) of the hollow fiber membranes 130 are sealed with thermosetting material. The sealed ends of the hollow fiber membranes 130 are immersed into the first potting material in the potting jig. The first potting material may include, without limitation, an urethane resin or an epoxy resin. The first potting material may be a material of relatively high hardness, for example, hardness of 80 to 120 Shore A. After the first potting material is hardened while the hollow fiber membranes 130 are immersed therein, the potting jig is removed. Subsequently, the hardened first potting material is cut in a direction perpendicular with the longitudinal direction of the hollow fiber membranes 130 so that the hollow fiber membranes 130 potted in the first sub-fixing layer 121 can be completed. At this time, the hollow fiber membranes 130 are cut together to have the hollows thereof reopened.

Then, as illustrated in FIG. 6, the first sub-fixing layer 121 in which the hollow fiber membranes 130 are potted is put on the protrusion part projecting at a certain distance from the inner side surface of the case 111 or on a step formed on the inner side surface of the case 111. The first sub-fixing layer 121 divides the first space S1 in the case 111 into the filtrate collecting space SS1 and the space SS2 for the hollow fiber membranes 130. The hollow fiber membranes are in fluid communication with the filtrate collecting space SS1 through the open ends thereof.

Subsequently, as illustrated in FIG. 7, the space SS2 for the hollow fiber membranes 130, the second space S2, and the through-hole H of the partition 112 are filled with the second potting material, and then the second potting material is hardened to form the second sub-fixing layer 122. The second sub-fixing layer 122 fixes the first sub-fixing layer 121 and hollow fiber membranes 130 in the case 111.

The second potting material, just like the first potting material, may include, without limitation, an urethane resin or an epoxy resin of high hardness, for example, hardness of 80 to 120 Shore A.

Referring to FIG. 8, a filtration membrane module 100 according to another embodiment of the present invention will be described hereinafter.

As illustrated in FIG. 8, the partition 112 may have substantially same height as the side wall of the case 111, and thus no part of the second sub-fixing layer 122 exists above the partition 112.

In such a case, provided that the size of the through-hole H of the partition 112 is identical, the interaction between the partition 112 and the part of the second sub-fixing layer 122 existing in the space SS2 for the hollow fiber membranes 130 and in the second space S2 is maximized, compared to the case in which the height of the partition 112 is smaller than that of the side wall of the case 111, so that the relative movement of the second sub-fixing layer 122 and the case 111 in horizontal direction can be effectively prevented.

Hereinafter, referring to FIG. 9, a filtration membrane module according to further another embodiment of the present invention will be explained.

As illustrated in FIG. 9, the second sub-fixing layer 122 has a potting surface to be in directly contact with an water to be treated, and the filtration membrane module 100 further comprises a protection layer 140 between the potting surface and the filtration membrane 130 so that the potting surface of the second sub-fixing layer 122 does not directly contact with the filtration membrane 130. The protection layer 140 has lower hardness than the second sub-fixing layer 122. Particularly, the protection layer 140 is formed of a soft material such as olefin, urethane, or epoxy resin having low hardness of 10 to 50 Shore A.

Since the filtration membrane 130 in the water to be treated shakes heavily during the filtration process, but for the protection layer 140, the part of the filtration membrane 130 which would be in contact with the potting surface of the second sub-fixing layer 122 would be damaged. Particularly, since the second sub-fixing layer 122 is formed of a hard material, the risk of such damage would be very high.

For the reasons above, the protection layer 140 is disposed between the potting surface of the second sub-fixing layer 122 and the filtration membrane 130 so that the potting surface of the second sub-fixing layer 122 does not directly contact with the filtration membrane 130, which can minimize the risk of the damage of the filtration membrane 130 that otherwise might be caused due to the severe shake of the filtration membrane 130 during the filtration process.

The methods for manufacturing the filtration membrane module comprising the protection layer are described in detail in the Korean patent application No. 10-2010-0119996 filed by the present applicant, the entirety of which are hereby incorporated by reference for all purposes as if fully set forth herein.

The invention claimed is:

1. A filtration membrane module comprising:
a plurality of filtration membranes;
a header comprising a case and a plurality of partitions, wherein the header provides a first space for insertion of the plurality of filtration membranes and a plurality of discrete second spaces, the second spaces provided on at least one side wall of the case are spaced apart from each other by at least one groove formed on an inner surface of the side wall, the respective second space is separated from the first space and enclosed by the respective partition and a portion of the side wall, the respective partition has a through-hole providing a communication path between the first space and the respective second space, and the case and the partitions being integrally formed into a unitary body; and
a fixing layer including a first part disposed in the first space, a second part disposed in the second space, and a third part filling the through-hole of the partition,
wherein the plurality of filtration membranes are potted only in the first part and no filtration membrane is potted in the second part, and
the plurality of filtration membranes have an open end to be in fluid communication with a filtrate collecting space defined by the case and the first part of the fixing layer.

2. The filtration membrane module of claim 1, wherein the partition's height is smaller than the side wall's height, and a portion of the fixing layer exists directly above the partition.

3. The filtration membrane module of claim 1, wherein the groove has a tapered shape getting larger toward an outer surface of the side wall, and a part of the fixing layer is inserted in the groove.

4. The filtration membrane module of claim 1, wherein the fixing layer comprises:
a first sub-fixing layer, the case and the first sub-fixing layer forming the filtrate collecting space in the first space; and
a second sub-fixing layer on the first sub-fixing layer,
and wherein the second sub-fixing layer exists in at least a portion of the first space, in the second space, and in the through-hole of the partition as well.

5. The filtration membrane module of claim 4, wherein the first and second sub-fixing layers are formed of same material.

6. The filtration membrane module of claim 4, wherein the second sub-fixing layer has a potting surface to be in direct contact with water to be treated, and
wherein the filtration membrane module further comprises a protection layer between the potting surface and the plurality of filtration membranes so that the potting surface of the second sub-fixing layer does not directly contact the plurality of filtration membranes.

7. The filtration membrane module of claim 6, wherein the protection layer has lower hardness than the second sub-fixing layer.

* * * * *